INVENTOR
Ross Anderson

BY Spencer & Kaye
ATTORNEYS

INVENTOR
Ross Anderson
BY Spencer & Kaye
ATTORNEYS

INVENTOR
Ross Anderson
BY Spencer & Kaye
ATTORNEYS

INVENTOR
Ross Anderson
BY Spencer & Kaye
ATTORNEYS

United States Patent Office 3,555,459
Patented Jan. 12, 1971

3,555,459
GYROMAGNETIC DEVICE HAVING A PLU-
RALITY OF OUTWARDLY NARROWING
TAPERING MEMBERS
Ross Anderson, Berkeley, Calif., assignor to Western
Microwave Laboratories, Inc., Los Gatos, Calif., a
corporation of Virginia
Filed Nov. 21, 1968, Ser. No. 777,804
Int. Cl. H01p 1/16, 1/32
U.S. Cl. 333—1.1                                  29 Claims

ABSTRACT OF THE DISCLOSURE

A wide band circulator or isolator device of the stripline or microstrip type which achieves a bandwidth exceeding one octave using standard polycrystalline ferrimagnetic materials, but which can achieve bandwidths up to and exceeding two octaves for certain configurations of the ferrite junction, or with a suitable mode suppressor. In the device, the inner conductor or circuit is planar and has a plurality of outwardly tapering legs each of which constitutes a port. Ferrimagnetic or gyromagnetic material is provided overlying a substantial portion of the circuit including at least substantially all of the portion thereof functioning as the input and output ports of the device. The energy in the device propagates along the edges thereof, and accordingly the edges are designed to be free of abrupt changes in order that there be no abrupt impedance changes in the circuit. Various methods of mode suppression for this device are provided including internally terminating one of the ports by an overlying layer of lossy material, and cutting slots through the ground plane in the same direction as the current flow of the desired mode of propagation.

BACKGROUND OF THE INVENTION

The present invention relates generally to the microwave art, and more particularly, to a circulator or isolator which is capable of achieving good performance over a large bandwidth.

For clarification, certain terms used herein are explained below as follows:

"Reduce to acceptable limits," when referring to moding or frequency sensitivity, means that the moding or frequency sensitivity has been reduced to the point where it does not lower the minimum isolation below approximately 18 db.

The circulators and isolators referred to are all magnetized transversely to the direction of energy propagation in the circulators and isolators and all are operated below ferromagnetic resonance.

Whenever "ferrite" is mentioned, it should be taken as any transversely magnetized gyrotropic or gyromagnetic medium. The word "ferrite" is used because, in most practical cases, the medium used is a ferrimagnetic substance such as ferrite or a garnet.

The first stripline circulators were symmetrical, three-port junctions with slabs of ferrites between the circuit and the ground planes. These were then made to operate over the desired band of frequencies by trial and error shaping of the circuit and ferrites. For these first stripline circulators, a bandwidth of 10% was considered good.

Later, Bosmal[1], Fay and Comstock[2], and others[3 and 4] made a partly empirical, partly theoretical analysis of the stripline circulator operated in the below ferromagnetic resonance mode in which the ferrite junction was designed to be a resonant cavity. The loaded Q of this cavity was made as low as possible by lowering the impedance of the ferrite junction, and then using quarter wave transformers to match this low impedance junction to the input impedance of standard coaxial lines—usually 50 ohms. Lowering the impedance of the junction raises the current in the circuit, increasing the coupling to the ferrite, thus lowering the Q of the resonant ferrite junction and increasing the bandwidth. Using a double step transformer results in a circulator that works over a frequency range of slightly greater than one octave.

The bandwidth of the above device is limited to one octave by, (1) the frequency sensitivity of the ferrite junction and the quarter wave transformers, (2) low field losses beyond the lowest frequency of operation of a given circulator, and (3) moding beyond the highest frequency of operation of a given circulator.

The frequency sensitivity is caused by the fact that the ferrite junction is cavity resonant and the quarter wave transformers are one quarter wavelength long only at one particular frequency. Thus the circulator will work only in a band of frequencies around the center design frequency.

Low field losses are a result of the inherent properties of the ferrite material commonly used in circulators. For polycrystalline garnet materials, it means that satisfactory operation cannot be achieved in the below ferromagnetic resonance mode of operation below a frequency given approximately by:

$$f_{\min} = \left(\frac{2}{3}\gamma\right)(4\pi M_s)$$

Where $f_{\min}$ = approximate minimum frequency of operation in mHz.

$(4\pi M_s)$ = saturation magnetization of the ferrite in gauss.

$\gamma$ = gyromagnetic ratio of the ferrite.

Moding occurs beyond the highest frequency of operation because the physical dimensions of the stripline and ferrite junction are large enough at these higher frequencies to propagate modes other than the desired TEM mode, thus disturbing the operation of the circulator.

In addition, the above devices were made only as three-port devices which gave only about 20 db isolation over a broad band. Previous attempts at making a four-port junction led to devices that showed poor performance (low isolation) and/or narrow bandwidths. Therefore, if a multiport (four or more ports) device was desired or if a larger isolation than about 25 db was desired over a wide band, it was necessary to connect two or more three-port circulators together, accepting the higher loss and added complication of a device with two or more ferrite junctions.

Therefore, in order to increase the bandwidth, isolation, versatility and otherwise improve the performance of the device, methods have been devised to, (1) eliminate or reduce to acceptable limits the frequency sensitivity of the circulator by using a nonresonant ferrite junction, (2) eliminate or reduce to acceptable values the moding by using a mode suppression technique or by designing the ferrite junction so that unacceptable moding is not set up, allowing the device to work over a frequency range up to and exceeding two octaves, (3) devise a multiport device from a single ferrite junction which gives 20 db minimum isolation over a wide band for each added port (i.e., 20 db for a three-port circulator, 40 db for a four-port, 60 db for a five-port, etc.) with little additional loss, (4) by using internal loading, make a device which gives 40 db, 60 db or more isolation for the internally loaded port.

SUMMARY OF THE INVENTION

An object of the present invention is to provide a wide bandwidth transmission device, such as a circulator which is not frequency sensitive due to the ferrite junction. The ferrite junction includes a circuit, ground plane(s) and slab(s) of ferrite between the circuit and ground plane(s). The maximum bandwidth, limited by low field losses at the low end and moding at the high end, is about one octave.

Another object is to devise a suitable mode suppressor in order to eliminate or reduce moding to acceptable limits at the upper end of the band. Thus bandwidths up to and exceeding two octaves are possible.

Another object is to design a ferrite junction in which undesirable modes are not set up, or are set up at such a low level as not to degrade performance to below acceptable limits.

Another object is to provide a transmission device with three, four, or n-ports with additional isolation achieved with each additional port.

Another object is to provide a device in which one or more ports of an n-port device are internally terminated in order to increase the isolation obtainable from that port, and also to provide mode suppression.

Another object is to provide a device that is not as sensitive to variations in $4\pi M_s$, as conventional circulators and isolators are.

Another object is to provide a device that is less sensitive to variations in D.C. magnetic field than is the case for existing devices.

Another object is to provide a device that is less sensitive to changes in temperature which causes change in D.C. magnetic field and $4\pi M_s$.

Another object is to provide a device in which symmetry is not an important factor.

There is a minimum size ferrite which is necessary for good operation. For the three-port device, the minimum diameter of the ferrite is approximately twice the diameter of the ferrite used in conventional circulators. But since this is a minimum diameter, any larger diameter will also work over the same frequency range. Therefore, another object is to provide a device whose physical dimensions can be varied with little effect on the performance of the device.

These objects and other are accomplished in accordance with the preferred embodiments of the invention wherein the inner conductor of a stripline is arranged to have a central portion and legs extending therefrom. The legs are generally tapered and the edges thereof are preferably connected together in a smooth manner. The tapered legs are free of abrupt changes in direction to assure that the rate of change of the edge of the circuit is less than the rate of circulation of a TEM wave in a transversely magnetized ferrite so that no larger mismatches occur which increase the frequency sensitivity of the junction and/or deteriorate the isolation.

BRIEF DESCRIPTION OF THE DRAWINGS

FIG. 6 is a plot of $de'/dy'$ against frequency.

FIG. 6 is a vertical sectional view taken through a microstrip circulator of the present invention generally along the plane defined by reference line A—A of FIG. 1.

THEORETICAL BACKGROUND OF THE INVENTION

Figures 6, 8:
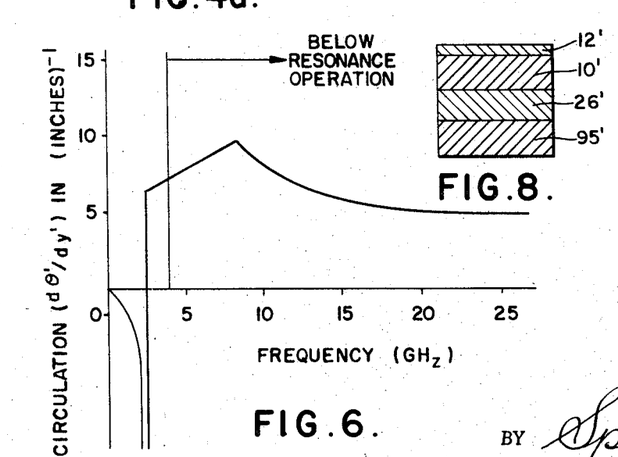

The following contains the theoretical derivation of propagation of a TEM wave in an ideal transversely magnetized gyromagnetic medium. Equation 21 gives the result of this calculation and FIG. 6 is a plot of Equation 21 for an idealized ferrimagnetic material having the dielectric constant and $4\pi M_s$ of yttrium-iron garnet. Equation 21 indicates that for a given $4\pi M_s$ of a saturated ferrite or other gyromagnetic medium, the TEM wave wants to circulate at a given rate $de'/dy'$ where $\theta'$ is the angle of circulation for a given arc length $y'$. For a given $4\pi M_s$, the TEM wave will, if boundary conditions allow it, circulate through $\theta'$. If boundary conditions are applied which allow the TEM wave to circulate only through $\theta$, by designing the circuit with $\theta < \theta'$, most of the energy of the TEM wave will tend to concentrate on the edge of the circuit. The application of this to the present invention will become clearer below.

A TEM wave is incident on a piece of ferrite biased to saturation by a D.C. magnetic field applied perpendicularly to the direction of energy travel of the TEM wave. The wave is assumed to be constrained to be a TEM wave; that is, only a TEM wave is allowed to propagate in the ferrite. The ferrite is assumed saturated and lossless. The D.C. magnetic field is in the $z$ direction. At time $t=0$, the direction of propagation of the TEM wave is in the $y$ direction, and its A.C. magnetic field (H) is in the $x$ direction (see FIGS. 24a and 24b).

These figures schematically indicate circulation in a transversely magnetized ferrite. When $\beta_{y'}$ is perpendicular to the magnetic field $B_0$ (see FIG. 24a) the TEM wave circulates $\theta'$ degrees when the wave has moved along a curved path of length $y'$. The manner of calculating $\theta'$ and $y'$ is given below.

(1) $$*\overline{H}=\overline{a}_x H \text{ at } y=0, t=0$$

Now consider this linearly polarized TEM wave to be made up of two counter rotating, circularly polarized TEM waves rotating not around the direction of propagation, but around the D.C. magnetic field; that is, the axis of rotation, while moving with the wave, is parallel to the D.C. magnetic field.

(2) $$\overline{H}^{cw}=(\overline{a}_x-j\overline{a}_y)\frac{H}{2}e^{-j\beta^{cw}y'}$$

(3) $$\overline{H}^{ccw}=(\overline{a}_x+j\overline{a}_y)\frac{H}{2}e^{-j\beta^{ccw}y'}$$

\* The notation used is similar to that used in reference (4)

(4) where $\beta^{cw}=\omega\sqrt{\epsilon}\sqrt{\mu_{11}-j\mu_{12}}=\omega\sqrt{\epsilon\mu^{cw}}$ (5) and $\beta^{ccw}=\omega\sqrt{\epsilon}\sqrt{\mu_{11}+j\mu_{12}}=\omega\sqrt{\epsilon\mu^{ccw}}$ $y'$ is used instead of $y$ in the phase term for a reason which will become apparent shortly.
Now (6) $$\overline{H}=\overline{H}^{cw}+\overline{H}^{ccw}=\frac{H}{2}[\overline{a}_x(e^{-j\beta^{ccw}y'}+e^{-j\beta^{cw}y'})$$
$$+j\overline{a}_y(e^{-j\beta^{ccw}y'}-e^{-j\beta^{cw}y'})]$$
$$=He^{-\frac{j}{2}(\beta^{cw}+\beta^{ccw})y'}\left[\overline{a}_x\cos\left(\frac{\beta^{cw}-\beta^{ccw}}{2}\right)y'-\overline{a}_y\sin\left(\frac{\beta^{cw}-\beta^{ccw}}{2}\right)y'\right]$$

This is seen to be a linearly polarized TEM wave that is curving (or circulating) as it is traveling. So $y'$ was used instead of $y$ because the direction of $y'$ is continually changing. The direction of $\overline{H}$ relative to its direction at $y'=0$ is given by (7) $$\tan\theta'=\frac{H_y}{H_x}=-\tan\left(\frac{\beta^{cw}-\beta^{ccw}}{2}\right)y'$$

(8) $$\theta'=\left(\frac{\beta^{ccw}-\beta^{cw}}{2}\right)y'$$

where $y'$=arc length. The constraint that the ferrite propagate only TEM waves is very important.

Since the wave is TEM and traveling in the $y'$ direction, the only components of the A.C. magnetic field are $H_x$ and $H_y$. Therefore, The wave equation (9) $$\nabla^2\overline{H}-\nabla(\overline{\nabla}\cdot\overline{H})+\omega^2\epsilon\hat{\mu}\overline{H}=0$$

reduces to (10) $$\frac{d^2}{dy'^2}\begin{bmatrix}H_x\\H_y\\0\end{bmatrix}+\omega^2\epsilon\begin{bmatrix}\mu_{11}\mu_{12}\,0\\\mu_{21}\mu_{22}\,0\\0\;\;0\;\mu_0\end{bmatrix}\begin{bmatrix}H_x\\H_y\\0\end{bmatrix}=0$$

(11) $\overline{\nabla}\cdot\overline{H}=0$ for TEM wave where (12) $$\mu_{11}=\mu_{22}=\mu_0\left[1+\frac{\omega_0\omega_M}{\omega_0^2-\omega^2}\right]$$

(13) $$\mu_{12}=-\mu_{21}=j\frac{\mu_0\omega\omega_M}{\omega_0^2-\omega^2}$$

(14) $$\omega_M=(\gamma)(4\pi M_z)$$

where $(4\pi M_S)$ is the saturation magnetization of the ferrite.

(15) $\omega_0=\gamma H$, where $H_0$ is the internal magnetic field.

(16) $\gamma$ is the gyromagnetic ratio for the ferrite.

Substituting Equation 2 into 10 we get (17) $$\beta^{cw}=\omega\sqrt{\epsilon}\sqrt{\mu_{11}-j\mu_{12}}$$

Substituting (12) and (13) into (17) obtains (18) $$\beta^{cw}=\omega\sqrt{\mu_0\epsilon}\left(1+\frac{\omega_M}{\omega_0-\omega}\right)^{1/2}$$

In like manner (19) $$\beta^{ccw}=\omega\sqrt{\mu_0\epsilon}\left(1+\frac{\omega_M}{\omega_0+\omega}\right)^{1/2}$$

Now substituting (18) and (19) into (8)

(20) $$\theta'=\frac{\omega\sqrt{\mu_0\epsilon}}{2}y'\left[\left(1+\frac{\omega_M}{\omega_0+\omega}\right)^{1/2}-\left(1+\frac{\omega_M}{\omega_0+\omega}\right)^{1/2}\right]$$

or, in differential form (21) $$\frac{d\theta'}{dy'}=\frac{\omega\sqrt{\mu_0\epsilon}}{2}\left[\left(1+\frac{\omega_M}{\omega_0+\omega}\right)^{1/2}-\left(1+\frac{\omega_M}{\omega_0+\omega}\right)^{1/2}\right]$$

An important case is when $\omega\gg\omega_0,\omega_M$. Then (22) $$\theta'=\frac{\sqrt{\mu_0\epsilon}\,\omega_M y'}{2}, \quad y'=\frac{2\theta'}{\omega_M\sqrt{\mu_0\epsilon}}$$

or, in differential form (23) $$\frac{d\theta'}{dy'}=\frac{\omega_M}{2}\sqrt{\mu^0\epsilon'}$$

That is to say, for $\omega\gg\omega_0,\omega_M$, circulation is independent of frequency. The real part of Eq. 21 is plotted as a function of frequency in FIG. 8.

FIG. 6 is a plot of Equation 21 of the circulation $d\theta'/dy'$ in inches$^{-1}$ against frequency. It is for a TEM wave in a ferrite with $f_M=5$ gHz. and $f_0=2.5$ gHz. and $\epsilon=15.2$. The ferrite is assumed to be lossless and saturated. The plot is the real part of equation 21. $f_M=(2\pi)(\gamma)(4\pi M_s)$.

$\gamma$=Gyromagnetic ratio=2.8 mHz./oe. for yttrium iron garnet.

$4\pi M_s$=saturation magnetization=1780 oe. for yttrium iron garnet.

$f_0$=ferromagnetic resonant frequency=$\gamma H_0$.

$H_0$=D.C. magnetic field inside the ferrite.

DESCRIPTION OF THE PREFERRED EMBODIMENTS

Figures 1, 2, 3:
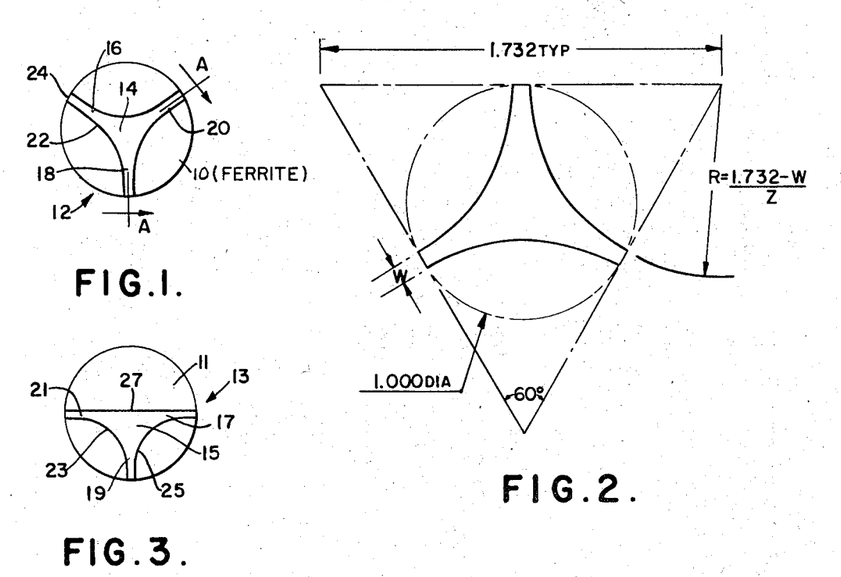
FIG. 1 is a plan view of a portion of a stripline or microstrip three-port circulator illustrating a ferrite disc with a planar circuit placed thereon.
FIG. 2 is an explanatory view showing the constructions of a circuit.
FIG. 3 is a plan view of a portion of a stripline or microstrip circulator illustrating a ferrite disc with an asymmetrical planar curvilinear circuit placed thereon.

With more particular reference to FIG. 1, a ferrite disc 10 is illustrated with a planar circuit member 12 disposed thereon. The planar circuit member includes a central portion 14 and, in the three-port symmetrical arrangement shown in FIG. 1, includes three legs 16, 18 and 20 extending equi-angularly therefrom. The edges 22 of the circuit which connect the legs together are curvilinear lines where the curvature is such that $d\theta/dy$ is less than $d\theta'/dy'$ along the entire length of the edge. This requires that the circuit over the ferrite have no abrupt changes in direction, where "abrupt" is considered to mean enough of a change to reduce the isolation of the device to unacceptable values or to make the circuit frequency sensitive such that the isolation or insertion loss deteriorate to unacceptable limits.

Although any curve within the above definition will work, considerable success has been achieved in which the edges of the circuit for the symmetrical three-port circulator are arcs of a circle whose diameter is approximately 1.7 times the diameter of the ferrite disc. An accurate construction of such a circuit is shown in FIG. 2 in which the ferrite disc has a 1″ diameter. Other lines within the definition of curvilinear, as used in this application, are elliptical, hyperbolic, parabolic, or any line within the restrictions listed in the Summary of the Invention, or any combination of these, such as is shown in FIG. 4 and as will be described below.

The input impedance of the ferrite junction may be designed to be any convenient value $z_0$ by using standard stripline or microstrip impedance calculations. Thus, given $z_0$, the thickness of the circuit, and the thickness and dielectric constant of the ferrite, the width of the circuit at point 24 in FIG. 1 may be determined.

The input impedance $z_0$ may be designed to match the impedance of external components or transmission lines, or designed to match the input impedance of a transformer between the ferrite junction and external components or transmission lines.

It should be noted that although a ferrite disc is shown in FIG. 1, only that part of the ferrite in the vicinity of the circuit and between the circuit and ground plane is utilized for circulation, and the remainder of the ferrite may be any shape, or may be removed.

FIG. 3 shows a portion of a circuit which is asymmetrical and which shows that symmetry is not necessary for good operation provided the limitations on circuit design, mentioned previously, are met. A ferrite disc 11 is provided as is a circuit 13 having a central portion 15 and three tapered legs 17, 19 and 21. The circuit 13 is formed of two arcs 23 and 25 and a straight edge 27. Many other asymmetrical arrangements are possible within the concept of the present invention.

Figure 4A:
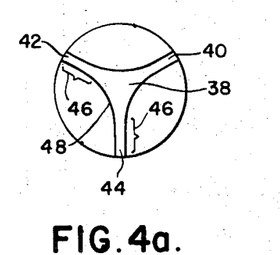
FIG. 4a is a plan view of a planar circuit on a ferrite disc in which the edge of each leg is made up of two different curvilinear lines in series.

FIG. 4a is an arrangement of the circuit member in which a central portion 38 is provided having legs 40, 42 and 44 extending therefrom. The end portions 46 of the legs are of uniform width. The circuit edges 48 which connect the legs together are arcs of a circle. However, edges 48 and 46 may describe any curvilinear line, and in addition, the edges of the legs may describe more than two curvilinear lines in series, as long as the edges are free of abrupt change in direction, and $d\theta/dy$ is less than $d\theta'/dy'$.

Figure 4B:
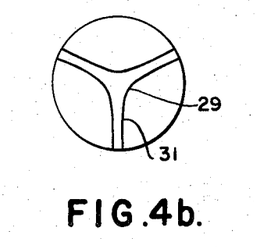
FIG. 4b is a view similar to FIG. 4a but wherein each edge of the circuit is constructed of two different curves.

FIG. 4b shows an arrangement similar to FIG. 4a but wherein first curves 29 are used and then second curves 31 are used.

Figure 5:
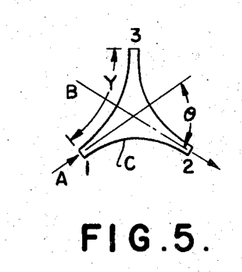
FIG. 5 is a plan view of a three-port planar circuit member constructed in accordance with the present invention and which is shown for explanatory purposes.

FIG. 5 is a diagrammatic view of a planar circuit of the present invention in which energy is introduced into port 1 in the direction illustrated. The energy now in the ferrite attempts to circulate at a rate of $d\theta'/dy'$ as derived in Equation 21 and plotted in FIG. 6. But the circuit has been designed in which the edge changes direction at the rate of only $d\theta/dy$ [1] which is less than $d\theta'/dy'$ as $$\frac{d\theta}{dy}=\frac{\theta}{y}=\frac{\theta}{2\pi R/6}=\frac{2\pi/6}{(2\pi)(.855)/6}=\frac{1}{.855}=1.17 \text{ inch}^{-1}$$

specified earlier. Consequently the energy, trying to circulate at a rate greater than the circuit will permit, concentrates on the edge of the circuit. Thus, most of the energy is near the edge and energy decays off in a direction perpendicular to the edge.

Therefore, almost all of the energy introduced into port 1 is transferred to port 2 with only a very little getting directly into port 3. If the diameter of the ferrite is large enough for a given ferrite $4\pi M_s$ (typically more than twice the diameter of the ferrite used in conventional circulators), the direct energy transfer from port 1 to port 3 is very low, typically much less than 1% (i.e., greater than 20 db down). Then most of the energy that does arrive at port 3 comes from the mismatch between the circuit and transmission line at port 2. This mismatch results from the slight frequency sensitivity of the junction, or from imperfect matching between the ferrite junction and the transformer or transmission line external to the ferrite junction.

Figure 7:
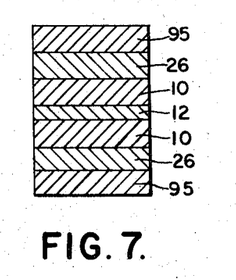
FIG. 7 is a vertical sectional view taken through a stripline circulator of the present invention generally along the plane defined by reference line A—A of FIG. 1.

In FIG. 7 it can be seen that the stripline arrangement includes the circuit 12, two ferrites 10, one disposed on each side of the circuit, and ground planes 26 against the outer surfaces of the ferrites. The biasing magnets 95 are on the outer surfaces of the ground planes 26.

---
[1] If the edges of the circuit are arcs of a circle as shown in FIG. 2, $d\theta/dy = \theta/y'$ where $\theta$ and $y$ are defined in FIG. 5. For the circuit of FIG. 2.

In FIG. 8 it can be seen that the microstrip arrangement includes the circuit 12', one ferrite 10' placed between the circuit and the ground plane 26', and a biasing magnet 95' located on the ground plane.

The stripline circulator described herein works due to the circulation of a TEM mode. A TEM mode is a transmission line mode in which the electric field, the magnetic field, and the direction of propagation of the wave are mutually perpendicular. (The microstrip circulator works due to the circulation of a transmission line mode similar to a TEM mode.) For the devices described so far, only the TEM mode propagates in about the first octave above the low frequency limit set by low field losses. It has been found that beyond the first octave, the device may mode. The frequency where the device starts to mode depends in general on the $4\pi M_s$ of the ferrite, the applied field, and the change in direction of the circuit ($d\theta/dy$). Once set up, these modes may be trapped and resonate, or, if the ferrite pieces are thick enough, these modes may launch into a parallel plate mode. In either case, the insertion loss and isolation deteriorate to unacceptable values.

However, according to the present invention, these modes can be prevented from forming or those which do form can be absorbed. For the TEM mode, current is in the direction of propagation, but for the TE modes, there are current lines both in the direction of propagation and perpendicular to the direction of propagation. Therefore, if the outer conductor of the stripline is slotted parallel to the TEM mode current flow, current flow for the TE modes will be interrupted, but the current flow of the TEM mode will be only slightly affected. Therefore, by interrupting the current flow of the TE modes, they can be prevented from propagating and the mode in the stripline ferrite device is forced to be TEM.

Figures 9, 10:
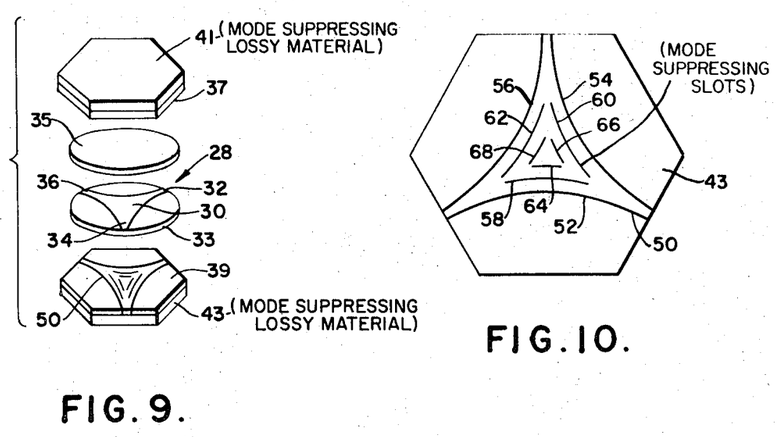
FIG. 9 is an exploded view of a stripline circular using one form of mode suppressor.
FIG. 10 is an enlarged plan view of one of the ground plane members of FIG. 9, and shows the construction of a mode suppressor.

FIG. 9 is an exploded view of a complete device with a mode suppressor according to the present invention. A circuit member 28 is provided which has a central portion 30 and projecting tapered legs 32, 34 and 36. Two ferrites 33 and 35 are provided, one on each side of the circuit member. A ground plane 37 is provided at the top of the device and over ferrite 35 and a ground plane 39 is provided adjacent ferrite 33. Ground plane 37 is a thin layer of conductive material connected to a thicker self-supporting layer of a lossy material 41 and ground plane 39 is connected to a similar material 43. Both of the ground planes are provided with slots 50 which extend through the ground plane itself and thus the slots in the ground planes 37 and 39 extend all the way through to the lossy material 41 and 43. These slots can be formed by using well-known etching techniques. However, if desired, only one of the ground planes can be formed with slots therethrough. Furthermore, if desired, a conventional ground plane member may be used on one side.

This high-loss material 41, 43 is placed behind the slots to absorb any energy which is set up across the slots, for example by TE modes. Thus, as the frequency of operation of such a device is increased, the desired TEM modes are propagated since the slots are formed in the direction of the currents of the TEM mode. However, the currents of other modes, such as TE modes, are at an angle or transverse to the slots and therefore fields set up across the slots by these modes are absorbed by the lossy material, thereby providing a higher possible frequency of operation to the device. This mode suppressor will allow operation up to and exceeding two octaves.

FIG. 10 is a plan view of the ground plane member 43 showing the slots 50 formed therein. While any suitable number of slots can be used, it has been found that the arrangement shown in FIGS. 9 and 10 provides good results. The outer series of slots 52, 54, 56 generally follow the contour of the circuit member itself. The next series of slots 58, 60, 62 are generally parallel to the outer series, and located approximately λ/4 from the outer series, where λ is the wavelength of the highest anticipated operating frequency, as measured in the ferrite. The third series have the same relationship to the second series as the second series have to the first series. The same is true for the fourth, fifth, etc., series until there is no more room. Each slot extends far enough toward the end of the leg to give adequate mode suppression with as little loss as possible to the desired TEM mode. The width of the slots of the mode suppressor is made as small as possible—typically 0.003 inch.

Figures 11, 12:
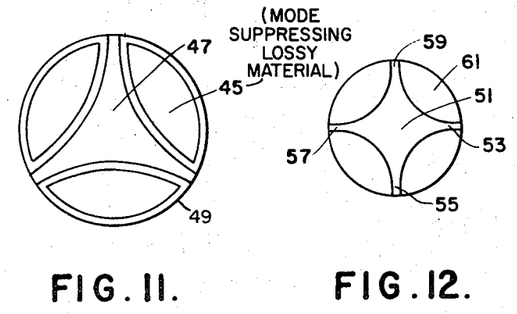
FIG. 11 is a plan view of a circulator with another type of mode suppressor placed in the plane of but exterior to the circuit.
FIG. 12 is a plan view of a portion of a four-port stripline or microstrip circulator illustrating a ferrite disc with a planar curvilinear circuit placed thereon.

FIG. 11 is a plan view of a circulator with another type of mode suppressor. It comprises pieces of lossy material 45 located in the plane of the circuit 47 and close enough to the circuit to absorb the undesired modes before they can resonate, but as far away as possible from the circuit to minimize the loss in the desired TEM mode. The pieces of lossy material 45 and the circuit 47 are disposed on a ferrite disc 49.

Mode suppression can also be achieved in an internally loaded circulator or isolator as discussed later.

FIG. 12 is similar to FIG. 1 except that the circuit 51 disposed on ferrite 61 contains four legs 53, 55, 57 and 59. A similar figure could be shown with five or more legs. Each additional leg will give more than 20 db additional isolation over a wide band provided that the field decay is designed to be high enough by making the diameter large enough for a given $4\pi M_s$, and the mismatch at each port does not exceed 1.2 to 1. A formula may be written for minimum isolation between adjacent ports over a wide band.

Minimum isolation between adjacent
ports $= (n-2)(20)$ db where $n$ is the number of ports. The larger $n$ is, the larger is the minimum diameter for the above equation to be true for a given $4\pi M_s$.

Figure 13:
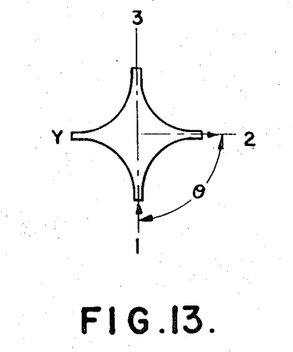
FIG. 13 is a plan view of a four-port planar circuit member constructed in accordance with the present invention and which is shown for explanatory purposes.

FIG. 13 shows a four-port device in which the power is entering port 1. The power exiting from port 2 is less than 0.5 db down from the power entering port 1. The power exiting from port 3 is more than 20 db down from port 1, and the power exiting from port 4 is more than 40 db down.

The multiport devices described above operate over about one octave without a mode suppressor and up to or exceeding two octaves with a suitable mode suppressor such as are shown in FIGS. 10 and 11, but adapted for multiport use.

Figures 14A, 14B:
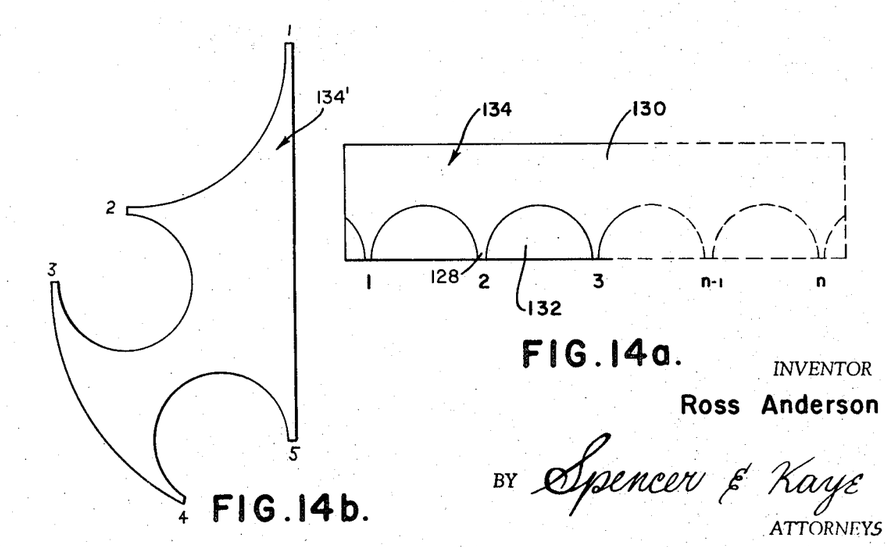
FIG. 14a is another form of an n-port device.
FIG. 14b is another, more general form of a multi-port device.

As pointed out earlier, symmetry is not a necessary condition for good operation. Two possible multiport devices are shown in FIGS. 14a and 14b. The circulator shown in FIG. 14a consists of a ferrite slab 132 with a planar circuit member 134 disposed thereon. The planar circuit member includes a central portion 130 with $n$ legs, such as leg 128, extending therefrom. These legs may come out in a straight line along one edge as shown in FIG. 14a, or they may come out in any manner along the perimeter of the circuit 134 such as shown in FIG. 14b. Again, the only requirement is that $do/dy$ of the edge of the circuit between adjacent low loss ports is somewhat less than $do'/dy'$. All of these circulators work in the same manner as stated in the description of FIGS. 5 and 12, and 13.

Figure 15:
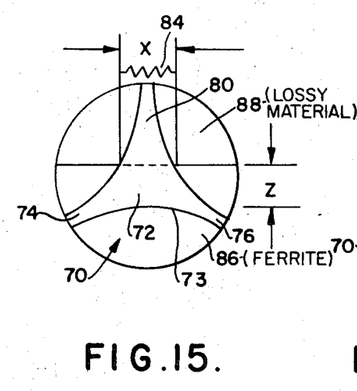
FIG. 15 is a plan view of a three-port device with one port internally terminated.
Figures 16, 17:
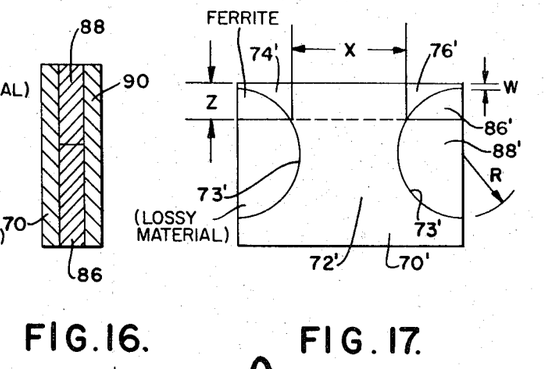
FIG. 16 is a sectional view through the device shown in FIG. 15.
FIG. 17 is another form of three-port device with one port internally terminated.

FIG. 15 is a plan view of a three-port device with one port internally terminated. FIG. 16 is a cross section through a microstrip version of this device. This means that lossy material is placed between the ground planes and the leg of the circuit that would conventionally be terminated in a matched load external to the ferrite junction. A three-port circulator with one port terminated is an isolator.

The circuit member 70 is shown having a central portion 72 and projecting tapered legs 74, 76 and 80. Leg 74 acts as the input port and leg 76 acts as the output port. The port associated with leg 80 may or may not be terminated in a matched load 84. A ferrimagnetic material 86 is provided across the input and output ports and across the edge of the circuit 73 joining the input and output ports and extends a distance z beyond this edge 73 toward the center of the circuit. The lossy material 88 is under the remainder of the circuit, i.e., under the remainder of leg 80. Ground plane 90 is also provided.

If the polarity of the biasing magnetic field is picked such that the power circulates in a counterclockwise manner, most of the power entering at leg 74 leaves at leg 76. z is chosen such that the power lever reaching the lossy material is small enough due to field decay so as not to increase the insertion loss to an unacceptable value.

If power is put into the device at leg 76, it circulates toward leg 80, and a considerable portion of this energy is absorbed by the lossy material 88 and the load 84. The power reaching port 74 from port 76 depends upon, (1) the amplitude of the power going directly from port 76 to port 74 due to incomplete field decay, (2) the power reaching port 74 by way of port 80 because of incomplete absorption at port 80, and (3) the power reaching 74 because of moding. The relative phase and amplitude of these powers as they add at port 74 determines the isolation of port 74 from port 76. This isolation is determined by the frequency of operation, the material parameters of the lossy material and ferrite, $d\theta/dy$ of the circuit, z and x, and the match of the load 84. In general, everything else being equal, the longer the interaction length x, the higher the isolation. Isolation achievable from internal loading can be designed to be any value up to 60 db. and can be designed to exceed 60 db.

Internal loading also provides mode suppression because the lossy material placed over the circuit absorbs modes that would normally be trapped over the circuit and absorbs them before they can resonate and deteriorate the performance of the device to unacceptable values.

FIG. 17 shows another form of three-port device with one port internally loaded. The circuit 70' is disposed over a lossy material 88' and a ferrite 86'. The circuit includes a central portion 72' having legs 74' and 76' extending therefrom which legs are formed due to arcs 73' which are formed in opposite sides thereof. This arrangement is preferred to the one shown in FIGS. 15 and 16 because x can be made arbitrarily long to get arbitrarily high isolation, z is easily adjusted to adjust the loss to an acceptable value, R is also easily adjusted, the input and output are in a line and, most important, the straight line edge of the circuit between ports 1 and 2 sets up only a small amount of moding, and this can be absorbed by the lossy material with very little deterioration of the loss and isolation characteristics of the device.

Figure 18:
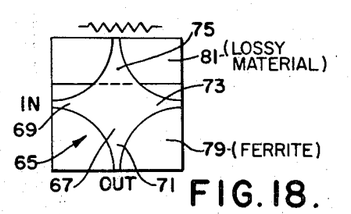
FIG. 18 is a plan view of a four-port device with one port internally terminated.

Any of the devices discussed so far many have one or more ports internally terminated in order to increase the isolation and provide mode suppression. The device shown in FIG. 18 is a four-port device like the one shown in FIG. 12, except that one port is internally terminated. In FIG. 18, the circuit member 65 is shown having a central portion 67 and projecting tapered legs 69, 71, 73, and 75. A ferrimagnetic material 79 is provided across the major portion of the device including leg 71 and most of legs 69 and 73. A bulk lossy material 81 is provided across leg 75 and the remainders of legs 69 and 73.

Figure 19:
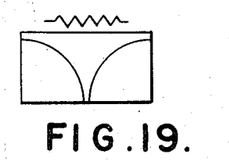
FIG. 19 is a plan view of another form of a four-port device with one port internally terminated.

FIG. 19 is like FIG. 18, except that the bulk material 81 has been replaced by a resistance card which provides the necessary lossy termination.

Figure 20:
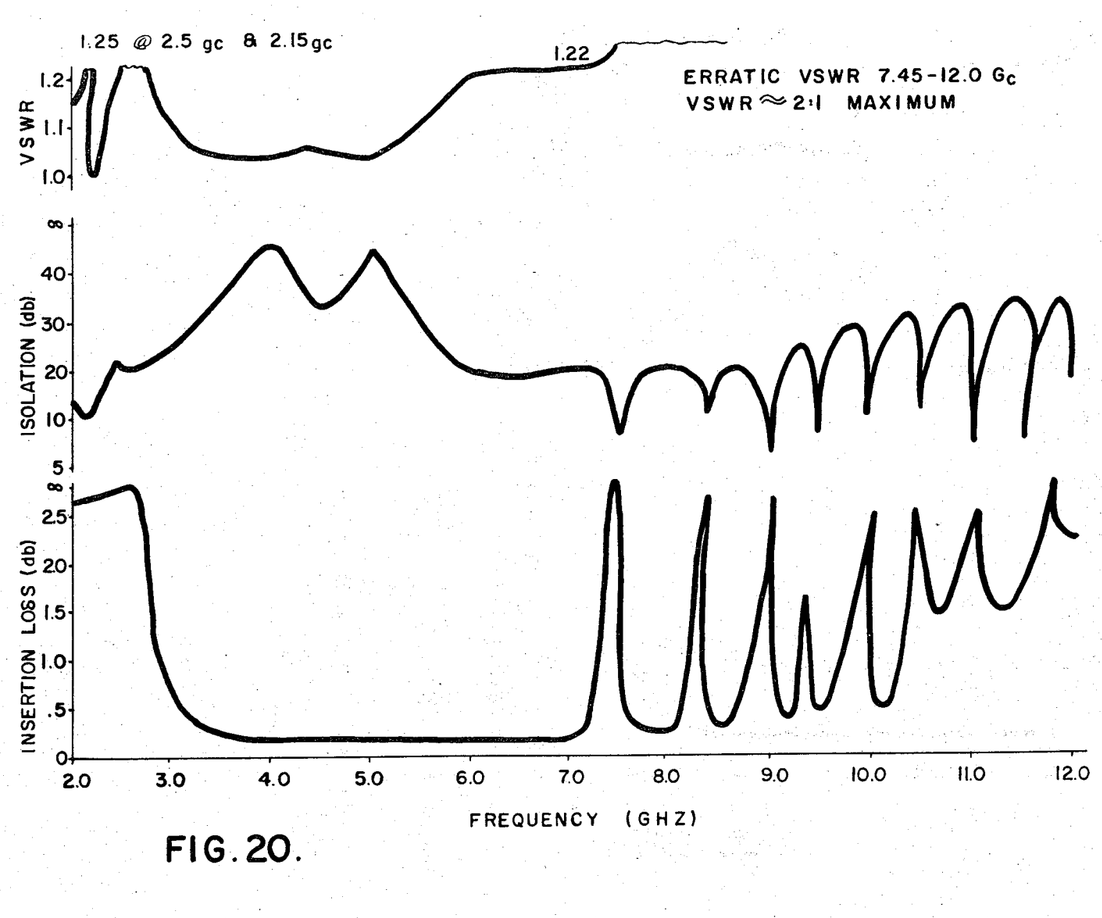
FIG. 20 is a plot of isolation, insertion loss, and VSWR against frequency for a device of the type shown in FIGS. 1 and 7.

FIG. 20 is a plot of isolation, insertion loss, and VSWR of a stripline version of the three-port device shown in FIG. 1. The ferrites used were 1.000 inch in diameter and 0.085 inch thick and made of polycrystalline yttrium-iron garnet which has a $4\pi M_s$, equal to 1780 gauss (Trans-Tech material number G113). The ground planes were made of silver-plated cold rolled steel. The circuit was made from a sheet of brass 0.005 inch thick to the dimensions shown in FIG. 2, where $w=0.021$ inch in order to have an input impedance of approximately 50 ohms. $d\theta/dy$ for this circuit is 1.17. $d\theta'/dy'$ is greater than 5.00 at all frequencies in the below resonance mode of operation and is therefore much greater than $d\theta/dy$. As can be seen from FIG. 20, the device had isolation exceeding 20 db. and insertion loss less than 0.5 db. from 3.3 to 6.9 gHz. Above 6.9 gHz. the device modes.

Figure 21A:
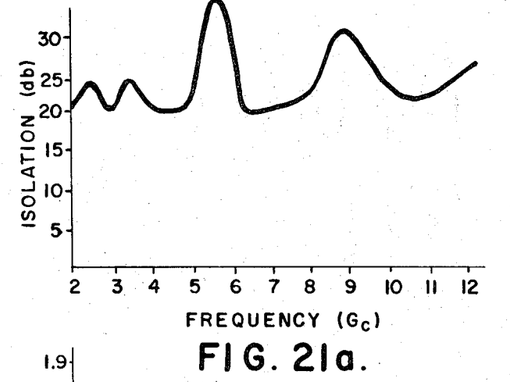
FIGS. 21a, b and c are plots of isolation, insertion loss, and VSWR, respectively, against frequency for a device of the type shown in FIG. 9.
Figure 21B:
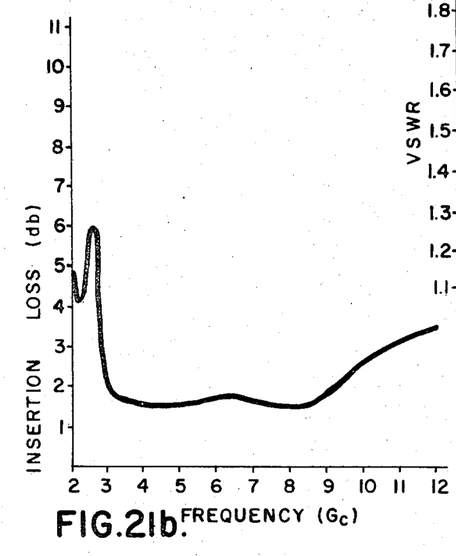
Figure 21C:
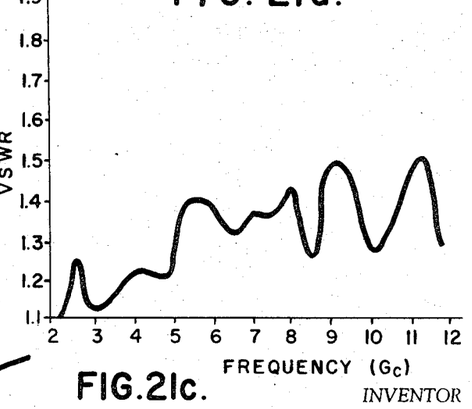

The moding can be eliminated by using a mode suppressor. Therefore, the silver-plated steel ground planes used above were replaced by ground planes containing a mode suppressor like that shown in FIGS. 9 and 10. The ground planes were made from a metallized lossy material, Emerson and Cummings MF116. The metallization was silver, about 0.001 inch thick. The slots were like those shown in FIG. 10 and were 0.003 inch wide and spaced 0.050 inch. The ferrite and the circuit remained the same as those used above. FIGS. 21 show the isolation (FIG. 21a) insertion loss (FIG. 21b), and VSWR (FIG 21c) of this device. The insertion loss is now higher than before but the device is now useful over a frequency range exceeding two octaves.

Figures 22, 24A:
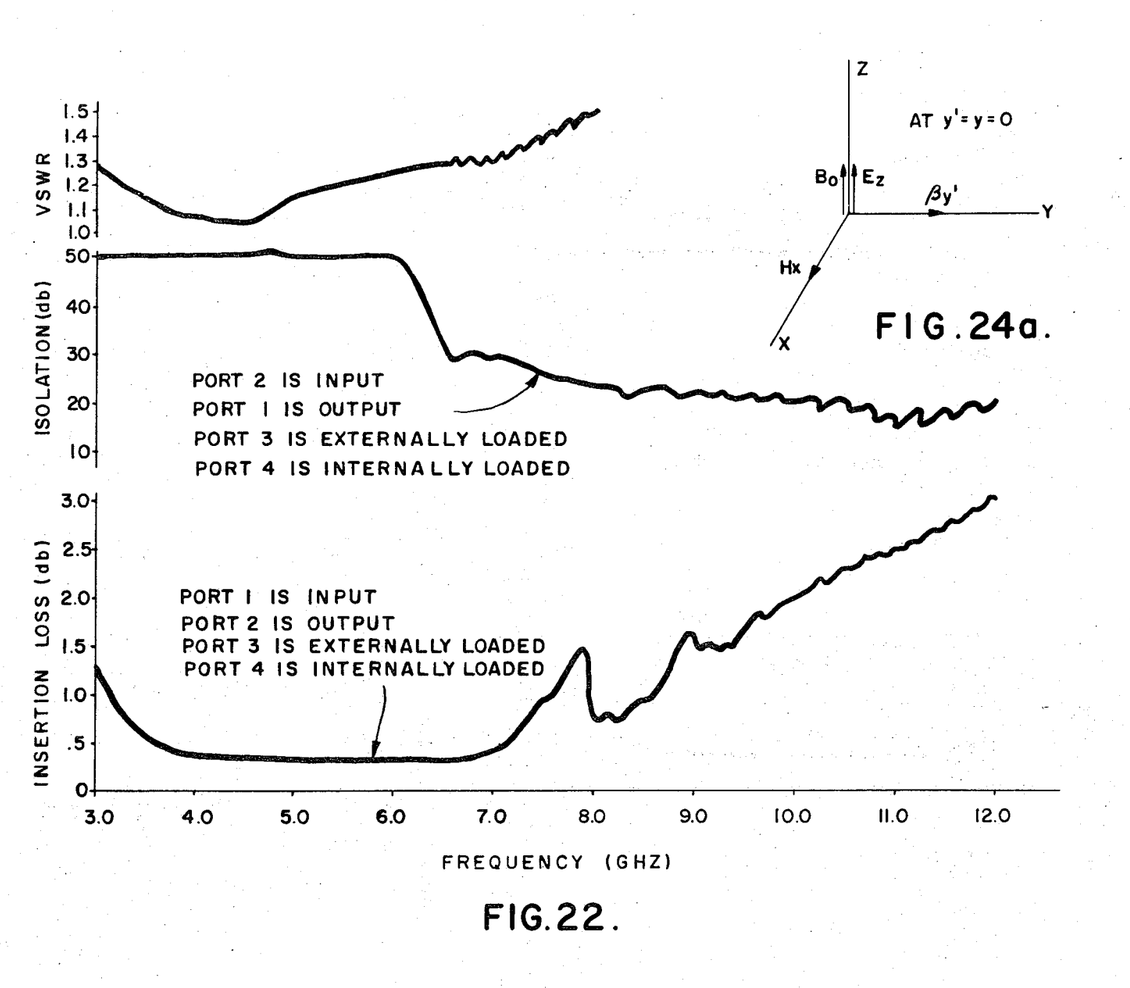
FIG. 22 is a plot of isolation, insertion loss, and VSWR against frequency for the device of the type shown in FIG. 18.
FIGS. 24a and 24b are explanatory views.
Figures 23, 24B:
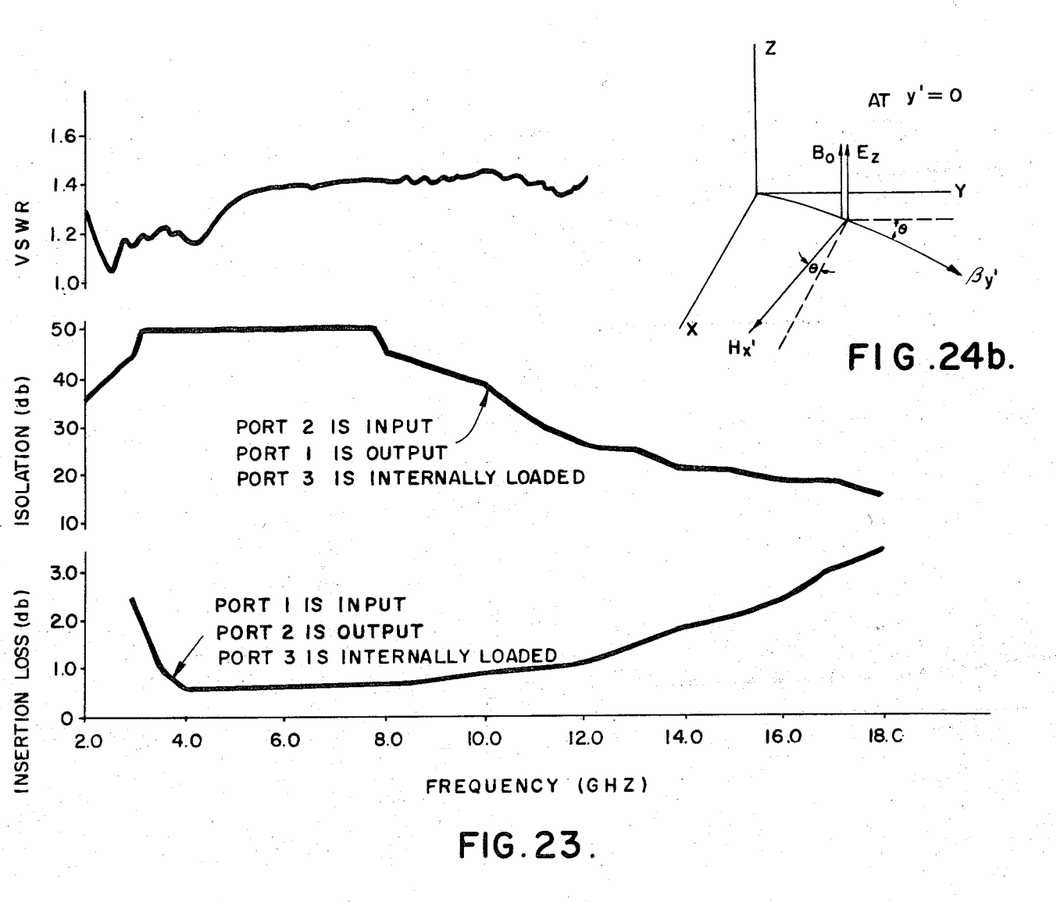
FIG. 23 is a plot of isolation, insertion loss, and VSWR for the device of the type shown in FIG. 17.

FIG. 22 is a plot of isolation, insertion loss and VSWR of a stripline version of the device shown in FIG. 18. The ferrite used was G113 with dimensions of 2.00 inches x 1.20 inches x 0.062 inch. The lossy material was 2.00 inches by 0.80 inch x 0.062 inch MF116. The circuit was 0.005 thick brass with $w=0.015$, and $R=0.092$ inch, where G113 and MF116 are defined above and $w$ and $R$ are defined in FIG. 2. The ground planes were silver-plated cold rolled steel. Leg 77 of FIG. 18 was terminated in a matched load, and the data plotted in FIG. 22 is between legs 69 and 71.

FIG. 23 is a plot of isolation, insertion loss, and VSWR of a stripline version of the device shown in FIG. 17. The ferrite used was 3.00 inches x 0.50 inch x 0.040 inch G113. The lossy material was 3.00 inches x 0.75 inch x 0.040 inch MF116. The circuit was made from 0.005 inch thick brass with $w=.010$, and $R=1.250$ inches. The ground planes were made from silver-plated cold rolled steel.

It should be understood that all of the embodiments of the invention discussed above which were not specifically shown and described as containing mode suppressors may be constructed with mode suppressors but were not described that way herein for purposes of clarity and to demonstrate that the invention includes such devices without mode suppressors.

It will be understood that the above description of the present invention is susceptible to various modifications, changes, and adaptations, and the same are intended to be comprehended within the meaning and range of equivalents of the appended claims.

I claim:

1. In a transmission line device whose upper frequency of operation is limited by undesired moding wherein said transmission line device is a circulator having a planar circuit means and a layer of ferrimagnetic material between said circuit means and a ground plane, the improvement comprising means for suppressing at least some of the undesired modes in said transmission line device, said mode suppressing means including a plurality of slots formed through said ground plane and extending in the direction of the currents of a desired mode and intersecting the currents of undesired modes, and a layer of lossy material adjacent the exterior surface of said ground plane.

2. A device as defined in claim 1, wherein said circulator is of the microstrip type.

3. The device recited in claim 1 wherein said circulator is of the stripline type.

4. A microwave transmission device comprising, in combination:
   ground plane means;
   conductive planar means disposed near and in parallel relation with and spaced from said ground plane means, said conductive planar means having a central portion and a plurality of outwardly narrowing tapering members extending therefrom, said planar means having a shape such that the impedance is free of abrupt changes and with at least the edges thereof which form and which directly join the ones of said members which constitute signal input and output ports for said device having a rate of change which is less than the rate of circulation of a TEM wave in said gyromagnetic means;
   gyromagnetic means disposed at least over a substantial portion of said central portion and substantially all of the ones of said tapering members which constitute signal input or output ports for said device and the edges directly joining adjacent input or output ports; and
   means for magnetically biasing at least the portion of said gyromagnetic means overlying said planar means.

5. A device as defined in claim 4, whose upper frequency of operation is limited by undesired moding, and further comprising means for suppressing at least some of the undesired modes.

6. The device recited in claim 4 wherein said device operates at non-resonance.

7. In a microwave transmission device of the type having ground plane means, circuit means near said ground plane means and including a central portion having a plurality of members extending therefrom, and gyromagnetic means adapted to be magnetized by a magnetic field and disposed adjacent to said circuit means, the improvement wherein said circuit means is planar and has a central portion and a plurality of outwardly narrowing tapering members extending therefrom, the edges of said circuit means forming and joining adjacent tapering members which constitute input or output ports for said circuit means are free of abrupt changes and have a rate of change which is less than the rate of circulation of a TEM wave in said gyromagnetic means; said gyromagnetic means is disposed over a substantial part of said central portion and over substantially all of the tapered part of the ones of said tapering members which constitute signal input or output ports for said circuit means including the entire edges of said circuit means joining said input and output ports; and there are means for biasing said gyromagnetic means throughout.

8. The improvement as defined in claim 7, wherein the edges of said circuit means on both sides of at least one of said tapering members respectively extend into another tapering member and define smooth continuous edges at least one of which is a straight line.

9. The device recited in claim 7 wherein said device operates at non-resonance.

10. The device of claim 7 wherein said device is a circulator and wherein said gyromagnetic means extends over at least all of the edges of said circuit means.

11. The improvement as defined in claim 7, wherein the edges of said circuit means on both sides of at least one of said tapering members respectively extend into another tapering member and define smooth curves.

12. The improvement as defined in claim 11, wherein said curves are identical.

13. The improvement as defined in claim 11, wherein said curves are arcs of circles.

14. The improvement as defined in claim 11, wherein said curves are segments of an exponential curve.

15. The improvement as defined in claim 11, wherein said curves are segments of a hyperbola.

16. The improvement as defined in claim 11, wherein said curves are segments of a parabola.

17. The improvement as defined in claim 7 wherein said circuit means is symmetrical.

18. The improvement as defined in claim 17 wherein said tapering members are disposed equi-angularly about said central portion.

19. A device as defined in claim 7 whose upper frequency of operation is limited by undesired moding and further comprising means for suppressing at least some of the undesired modes.

20. A device as defined in claim 19 wherein said mode suppressing means includes a lossy material over at least a portion of said circuit through which at most a minimum of currents of the desired mode passes.

21. A device as defined in claim 20 wherein the circuit has four tapering members, one of which is terminated by said lossy material in order to increase the isolation realizable from said tapering member.

22. A device as defined in claim 20 wherein said circuit has three tapering members, one of which is terminated by said lossy material in order to increase the isolation realizable from said tapering member, thereby to provide an isolator.

23. A device as defined in claim 22 wherein the edge of the circuit joining the remaining two tapering members is a straight line, to minimize undesired moding.

24. In a microwave transmission device of the type having ground plane means, circuit means near said ground plane means and including a central portion having a plurality of members extending therefrom, and gyromagnetic means adapted to be magnetized by a magnetic field and disposed adjacent to said circuit means, the improvement wherein all of said previously mentioned means are arranged so that the device operates at non-resonance; said circuit means is planar and has a central portion and a plurality of generally tapering members extending therefrom, and the edges of said circuit means have a shape which provides that the impedance is free of abrupt changes; and means for suppressing at least some of the undesired modes which limit the upper frequency of operation of said device, said mode suppressing means including said ground plane means which comprises at least one thin conductive layer mounted on a thicker layer of lossy material, at least one of said thin layers having slots formed therethrough which extend in the direction of the currents of the mode which it is desired to propagate.

25. A microwave isolator device for providing for the passage of a signal between an input and an output port comprising:

(a) a planar conductive circuit means having a central portion and three outwardly extending members, with a first of said members constituting the input port and a second of said members constituting the output port for said device, the edges of said circuit means which join adjacent members being free from abrupt changes with the edge thereof joining the two members which constitute the input and output ports being a straight line;

(b) ground plane means adjacent said circuit means;

(c) gyromagnetic means between said ground plane means and said circuit means, said gyromagnetic means overlying at least said first and said second members and said straight line edge of said circuit means;

(d) a layer of lossy material overlying the third of said members, said layer of lossy material being coplanar with and abutting said gyromagnetic means; and (e) magnetic field generating means for biasing said gyromagnetic means.

26. The device of claim 25 wherein said device is of the stripline type.

27. The device of claim 25 wherein said device is of the microstrip type.

28. The isolator defined in claim 25 wherein the rate of change of said edges of said circuit means is less than the rate of circulation of a TEM mode wave in said gyromagnetic means.

29. The isolator defined in claim 28 wherein the circuit means and the gyromagnetic means are arranged so that the device operates at non-resonance.

References Cited

UNITED STATES PATENTS

| | | | |
|---|---|---|---|
| 2,759,156 | 8/1956 | Younker | 333—98(M) |
| 3,246,261 | 4/1966 | Stelzer | 333—1.1 |
| 3,390,356 | 6/1968 | Ryals et al. | 333—10X |
| 3,414,843 | 12/1968 | Jansen | 333—1.1 |
| 3,456,213 | 7/1969 | Hershenov | 333—1.1 |

OTHER REFERENCES

S. Yoshida, Strip-Line Y Circulator, Proc. of the IRE, July 1960, pp. 1337, 1338.

PAUL L. GENSLER, Primary Examiner

U.S. Cl. X.R.

333—24.2, 84